Sept. 24, 1957   J. W. JACOBS   2,807,148
REFRIGERATING APPARATUS
Filed Nov. 29, 1954   5 Sheets-Sheet 1

INVENTOR.
James W. Jacobs
BY R. R. Candor
His Attorney

Sept. 24, 1957      J. W. JACOBS      2,807,148
REFRIGERATING APPARATUS

Filed Nov. 29, 1954      5 Sheets-Sheet 2

INVENTOR.
James W. Jacobs
BY R. R. Candor
His Attorney

INVENTOR.
James W. Jacobs
BY R. R. Candor
His Attorney

INVENTOR.
James W. Jacobs
BY R. R. Candor
His Attorney

Sept. 24, 1957 J. W. JACOBS 2,807,148
REFRIGERATING APPARATUS
Filed Nov. 29, 1954 5 Sheets-Sheet 5

INVENTOR.
James W. Jacobs
BY R. R. Candor
His Attorney

United States Patent Office 2,807,148
Patented Sept. 24, 1957

2,807,148

REFRIGERATING APPARATUS

James W. Jacobs, Dayton, Ohio, assignor to General Motors Corporation, Detroit, Mich., a corporation of Delaware Application November 29, 1954, Serial No. 471,708

7 Claims. (Cl. 62—4)

This application relates to refrigerating apparatus, and more particularly to an air conditioning system for automobiles or the like.

An object of this invention is to provide an improved variable ratio drive between the engine of an automobile or the like and the compressor which provides refrigeration for cooling a space in such automobile.

Another object of this invention is to provide a variable ratio drive for a compressor or the like from a driving shaft, in which a first magnetic clutch is placed on the compressor shaft for producing a first speed ratio drive for said compressor, and in which a second magnetic clutch is mounted on a separate shaft, from which belting is connected to said compressor shaft for producing a second speed ratio drive for said compressor.

Another object of this invention is to provide a pulley and magnetic clutch construction of such character that identical constructions can be placed on the compressor and pump shafts with belting between them and the engine to provide a variable ratio drive for the compressor.

Further objects and advantages of the present invention will be apparent from the following description, reference being had to the accompanying drawings wherein a preferred form of the invention is clearly shown.

Figure 6:
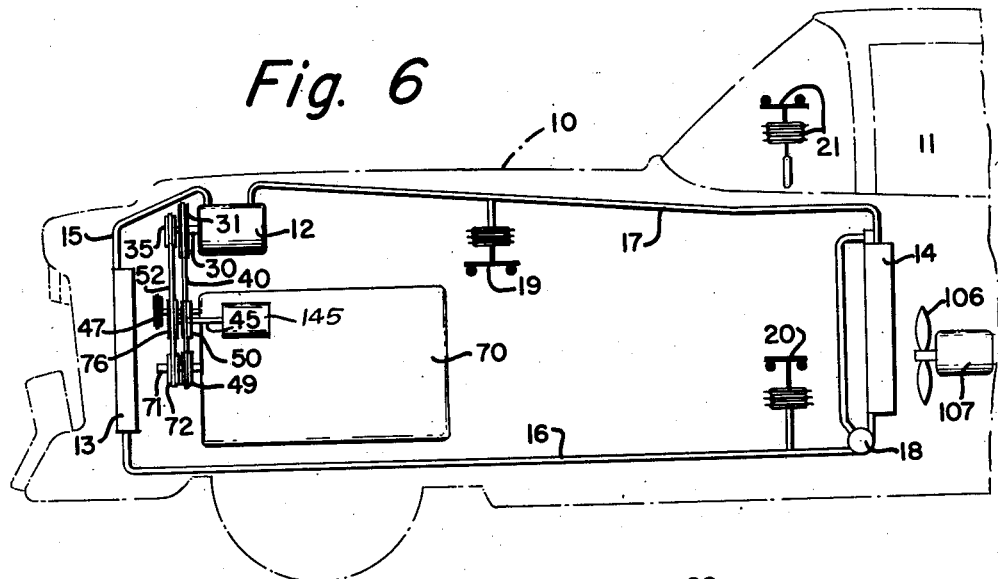
Figure 6 is a diagrammatic view showing the mounting of the air conditioning system on a vehicle.

Referring first to Figure 6, a vehicle or automobile 10 is provided with a space 11 to be cooled. A refrigerating system for cooling such space 11 may include a compressor 12, a condenser 13 and an evaporator 14 in refrigerant flow relationship, the refrigerant flowing through pipes 15, 16 and 17, and the evaporator being provided with any suitable expander, such as a thermostatic expansion valve 18, capillary tube, etc. A refrigerant back pressure control switch 19 stops operation of the refrigerating system when the suction refrigerant pressure falls below a predetermined limit. A refrigerant high side pressure switch 20 stops refrigeration when the refrigerant pressure on the high side rises above a predetermined limit. A thermostatic switch 21 starts refrigeration when the passenger space temperature rises above a first limit. The compressor 12 may be driven at varying speed ratios as long as the temperature is above such limit, the ratios being varied in response to various conditions on the vehicle hereafter to be described.

Figure 4:
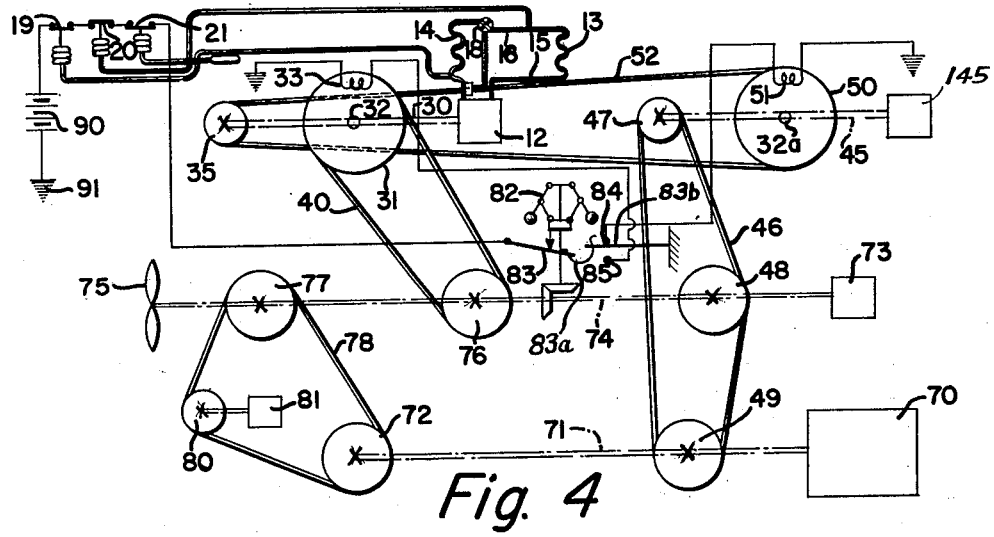
Figure 4 is a diagrammatic representation of the belting placed in front of the automobile engine, and driving the compressor and other elements on the vehicle.

Referring more particularly to Figure 4, the compressor 12 is provided with a rotatable compressor shaft 30 for operating the compressor. A compressor first speed ratio pulley 31 is freely rotatable on the compressor shaft through the medium of ball bearing 32. (In Figure 4, freely rotatable pulleys are indicated by small circles at the shaft and fixed pulleys are indicated by cross marks at the shaft.) A compressor first speed magnetic clutch 33 is provided for clutching the pulley 31 to the compressor shaft 30. A driven compressor second speed pulley 35 is fixed on the compressor shaft 30. Conveniently, the pulley 31 may be the low speed ratio pulley, and the pulley 35 may be the high speed ratio pulley, but it is to be understood that these ratios may be reversed. The action is such that when the magnetic clutch 33 is energized, to secure the pulley 31 to the shaft 30, then shaft 30 is driven by belt 40 and pulley 31 at relatively low ratio speed, while the pulley 35 is not receiving any driving action from the belt 52 passing thereover, as hereafter more fully explained.

The high speed ratio is produced by pulley 35 which is driven through separate driven element shaft 45 driven by the engine, as by belt 46 and pulleys 47, 48 and 49. The shaft 45 may drive a separate driven accessory element, such as a power steering pump 145 or the like. A driving compressor second speed ratio magnetic pulley 50 is freely rotatable on the shaft 45 on bearing 32a. A compressor second speed magnetic solenoid 51 clutches the pulley 50 to the shaft 45. The pulleys 47 and 50 may be substantially of the same construction as shown with regard to pulleys 31 and 35 previously referred to, except that they are mounted on the shaft 45 instead of the shaft 30. Belting 52 connects the pulley 50 with the pulley 35.

Electric control means are provided for selectively energizing the magnetic clutch solenoids 33 or 51. The operation is such that when the magnetic clutch or solenoid 33 is enerized while the magnetic clutch or solenoid 51 is deenergized, a first (low) speed ratio drive is secured between the engine and the compressor through pulleys 49, 48, 76 and 31. On the other hand, when the magnetic clutch or solenoid 51 is energized, and the magnetic clutch 33 is denergized, then a second (high) speed ratio drive is produced between the engine and the compressor through pulleys 49, 47, 50 and 35.

Figure 1:
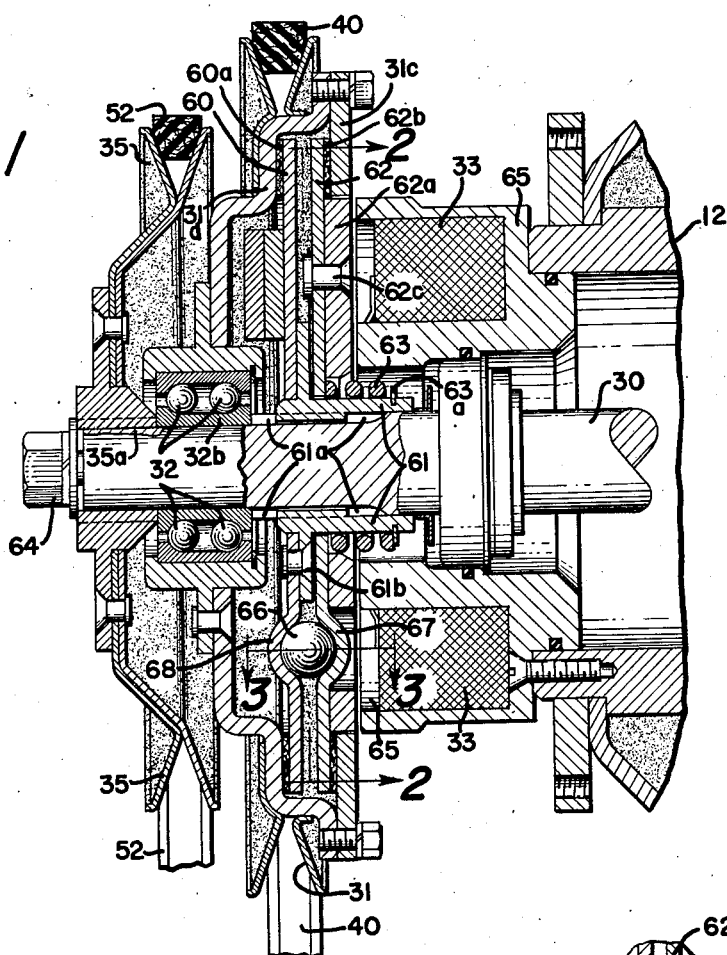
Figure 1 is a cross-sectional view showing a magnetic clutch construction applicable to the compressor shaft and to the separate (power steering pump) shaft.
Figure 2:
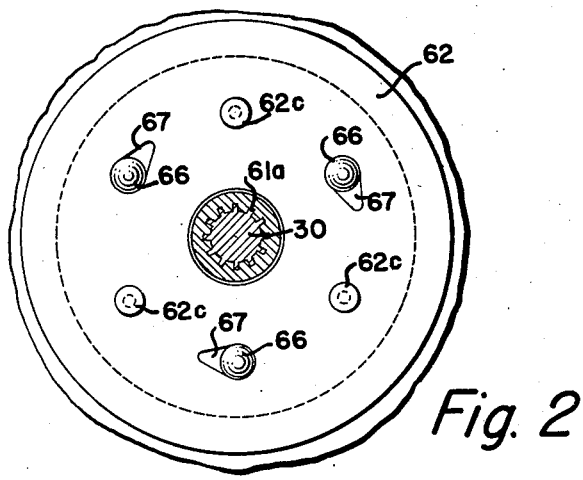
Figure 2 is a cross-section taken along the line 2—2 of Figure 1.
Figure 3:
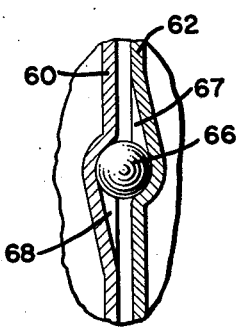
Figure 3 is a cross-section taken along the line 3—3 of Figure 1.

Figures 1 through 3 show substantially identical magnetic clutches which may be used on shafts 30 and 45. For example, a disk 60 is rotationally fixed but axially movable on shaft 30 as it is secured to a sliding hub 61, by bolts 61b, which is keyed to the splines 61a on shaft 30 (or shaft 45, as the case may be). A second disk 62 is freely rotatable and axially movable on the hub 61 and is urged leftwardly by the compression spring 63 which bears against the split ring 63a. The pulley 31 is freely rotatable on shaft 30 through the medium of ball bearing 32. The pulley 35 is rotatably fixed on shaft 30 by any suitable means, such as a key 35a. The pulley 35 and the inner ring 32b of bearing 32 are pulled tight against the ends of splines 61a by the washer and nut construction 64. An annular solenoid 33 is mounted within annular cup 65, carried by the body of compressor 12. The cup 65 is a magnetic "core" which pulls the armature 62a and the disk 62 secured thereto by bolts 62c rightward when the solenoid 33 is energized. The disk 62 has a friction face 62b which drivingly engages the left friction face of ring 31c carried by pulley 31. The disk 60 has a friction face 60a which engages the friction face 31d of the pulley 31 when the solenoid 33 is energized due to a spread reaction, as hereafter explained.

Relative rotation spread reaction means are placed between the disks 60 and 62, which may take the form of ball 66 and teardrop 67 and 68 constructions equally spaced around the shaft 30 as indicated in Figure 2.

When the solenoid 33 is energized, the friction face 62b is pulled against ring 31c and this causes a relative rotation between disks 60 and 62. This relative rotation, in turn, causes a spreading action between the disks by the reaction of balls 66 and teardrops 67 and 68, which causes tight engagement between the disks 60 and 62 with the corresponding friction faces of pulley 31, thereby causing a slow speed ratio drive between the engine 70 and compressor 12.

The construction of pulleys 47 and 50 on shaft 45 may be identical with that heretofore described for pulleys 31 and 35. It is understood that the pulley 50, when solenoid 51 is energized, drives belt 52 from shaft 45, whereas pulley 31, when solenoid 33 is energized, is driven by belt 40 and drives shaft 30. The constructions, however, may be otherwise identical.

Returning to Figure 4, the engine 70 is provided with a drive shaft 71 to which the pulleys 49 and 72 are fixed. An engine cooling system water pump 73 is provided with a shaft 74 on which is mounted the engine cooling system fan 75. Pulleys 48, 76 and 77 are fixed on shaft 74. Belt 78 passes over pulleys 72, 77 and 80 to drive the generator 81. A centrifugal governor 82 controls a switch blade 83 which rocks C spring 83a, which in turn counter-rocks the contact blade 83b into engagement with the high speed contact 84 or the low speed contact 85. When the engine is running below a predetermined low speed, the contact 84 is energized as shown in Figure 4, and the high speed ratio magnetic solenoid 51 is energized to cause the compressor 12 to be driven at a high speed ratio. When the engine is running above a predetermined speed, then the low speed contact 85 is energized thereby energizing the low speed ratio solenoid 33 and the compressor 12 is driven at a low speed ratio as compared to the engine speed. If the passenger space temperature is below a selected temperature, the switch 21 opens the electric line and deenergizes both clutches. If the refrigerant suction pressure is below a predetermined minimum, the switch 19 deenergizes the solenoids, and if the refrigerant pressure on the high side rises above a predetermined limit, then the switch 20 deenergizes the solenoids.

Figure 5:
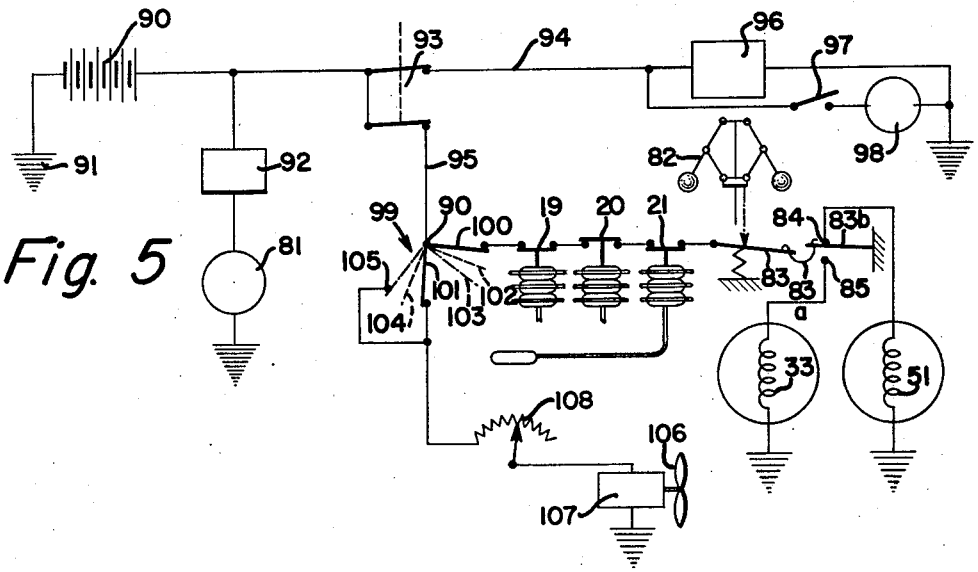
Figure 5 is a wiring diagram more fully showing the electrical control of the air conditioning system of Figure 4.

Figure 5 shows further wiring details with respect to the air conditioning system shown in Figures 1 through 4. For example, a battery 90 is grounded at 91 and is charged by the generator 81 through the medium of the well known relay and cutout switch 92. A combined ignition and air conditioning switch 93 energizes the ignition and starter line 94 and the air conditioning line 95. The line 94 is connected to the ignition system 96 of the engine 70, and is connected to the starter switch 97 and the starter 98. The air conditioning line 95 is connected to the manual two-way switch 99 having simultaneously movable refrigeration blade 100 and blower blade 101. Blade 100 is movable to the off position 102 and to the idle position 103. Blade 101 is simultaneously moved to the off position 104 and to the ventilation position 105. When the blades 100 and 101 are in the full line position, then air conditioning refrigeration, with the operation of blower 106, is provided. When the blades are in the off position 102 and 104, the air conditioning system and the blower system are completely deenergized. When the blades are in positions 103 and 105, then the refrigeration system is deenergized and the blower system 106 is energized. The blower 106 is operated by the motor 107 at varying speed controlled by the manually adjustable rheostat 108. The blower 106 blows air over evaporator 14.

The refrigerating system is controlled by the switches 19, 20 and 21 as previously described. The centrifugal governor 82 operates the blade 83 to energize either the low speed solenoid 33 or the high speed solenoid 51 through the medium of contacts 84 and 85 as previously described with respect to Figure 4.

Figure 7:
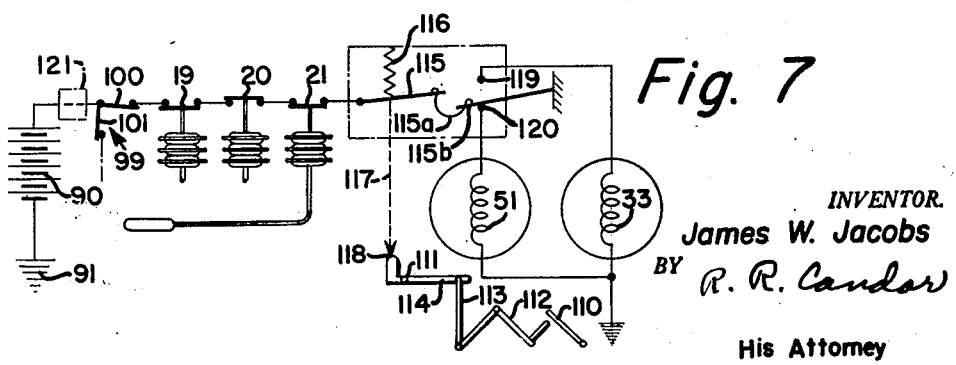
Figure 7 is a diagrammatic wiring diagram showing a throttle control for the clutch system.

Figure 7 shows a throttle control for selecting high or low speed ratios for the compressor drive. Figure 7 shows the throttle pedal 110 in idling position. A pedal 110 operates the throttle 111 of the engine in a well known manner such as by bell crank 112, link 113 and lever 114. When the pedal is depressed to a position corresponding substantially to 60 miles per hour in the vehicle while the car is in high gear, the blade 115 is moved downwardly from the full line position by spring 116 and link 117 against the end 118 of lever 114, so that blade 115b is counter moved upwardly to energize the contact 119 which energizes the solenoid 33 to produce the low speed ratio drive. When the throttle is moved to the full line position, corresponding to a vehicle speed below 60 miles per hour in high gear, then the blade 115 is in the full line position to energize the contact 120 and the high speed solenoid 51 is energized. Other parts of the system may be substantially as described with respect to Figures 4, 5 and 6, and any parts of the wiring system not reproduced in Figure 7 are indicated by the square 121. The same square 121 is used in other figures for the same purpose.

Figure 8:
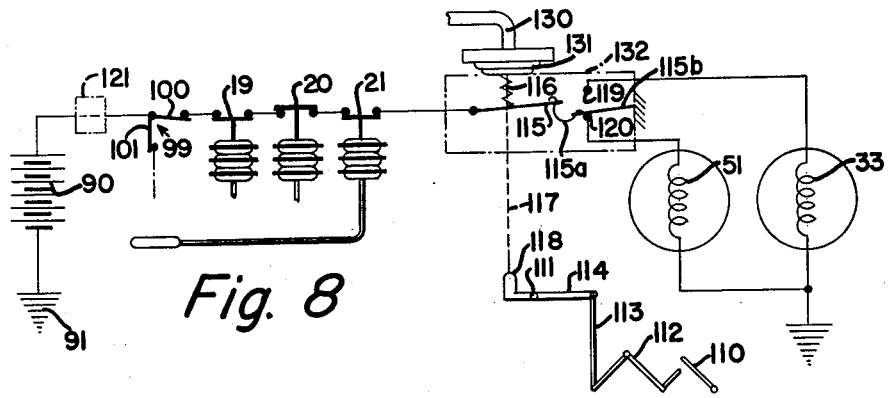
Figure 8 is a wiring diagram similar to Figure 7 but showing the addition of a manifold control.
Figure 14:
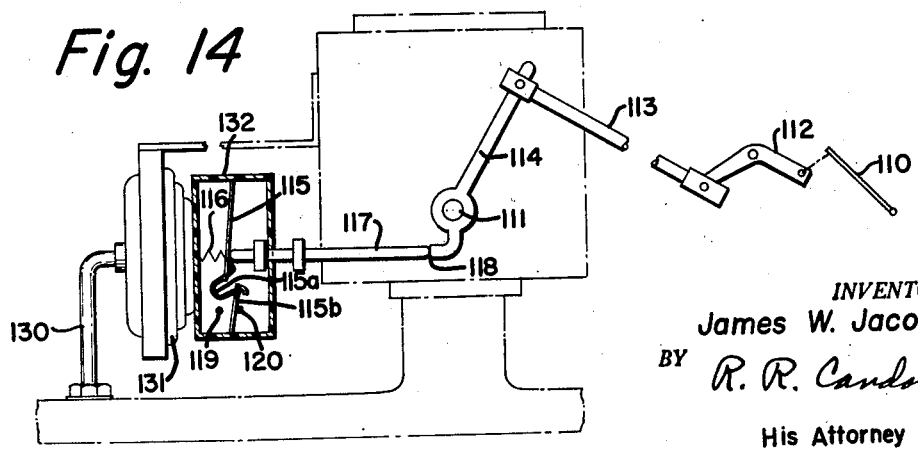
Figure 14 is a view somewhat diagrammatic showing the cooperating effect between the engine throttle and the engine manifold in controlling the varying speed ratio.

Figures 8 and 14 show a control for the magnetic clutches which is responsive to a combined action of the engine throttle and of the engine suction manifold. Members 110 through 120 are the same as described in Figure 7, except as modified by the manifold pressure as now to be described. The tube 130 is connected to the engine intake manifold. A flexible diaphragm 131 moves inwardly and outwardly in response to manifold pressure. The diaphragm 131 carries or moves the switch box 132 to modify the action of the pedal control.

The relative positions of the throttle 111 (or pedal 110) and of the suction responsive bellows 131 determine which speed ratio will become effective between the engine 70 and the compressor 12. The effect is that the engine drives the compressor at high speed ratio whenever the engine speed is below that corresponding to 60 miles per hour (high car gear) and drives the compressor at low speed ratio whenever the engine is above that corresponding to 60 miles per hour (high car gear), the effect being that the compressor is not driven at destructively high speeds.

When the engine is idling and the pedal 110 is not depressed, the suction pressure in manifold tube 130 is low and the switch is as shown in Figure 14 with the switch blade 115b closed on contact 120 which energizes the high speed ratio solenoid 51 of the clutch shown in Figure 1. When the pedal is depressed suddenly to a high engine speed position, corresponding to 60 miles per hour (high car gear), for example, the manifold pressure rises because of the opening of the throttle 111 while the engine is still operating at a speed below such 60 miles per hour. The rightward movement of rod 117 when the pedal is depressed ordinarily would cause a low ratio drive of the compressor by movement of the blade 115 to the right with movement of the switch blade 115b to the left against the contact 119, by the action of C-spring 115a, which energizes the low speed ratio drive solenoid 33 of the compressor. However, the relatively high pressure in the manifold tube 130, due to low engine speed corresponding to below 60 miles per hour (high car gear), causes bellows 131 to push the switch box 132 to the right and thus neutralize the rightward movement of rod 117 to prevent compressor ratio shift until the engine speed has increased to a high speed of 60 miles per hour. When the engine speed corresponds to 60 miles per hour (high car gear), and the pedal 110 is still depressed, the switch box 132 is pulled leftward by bellows 131 due to suction pressure fall, and the blade 115 moves rightward, relatively to the box 132, and snaps switch blade 115b leftward against contact 119, which causes the compressor to be driven at the low speed ratio. This prevents destructive high speed operation of the compressor.

Figure 9:
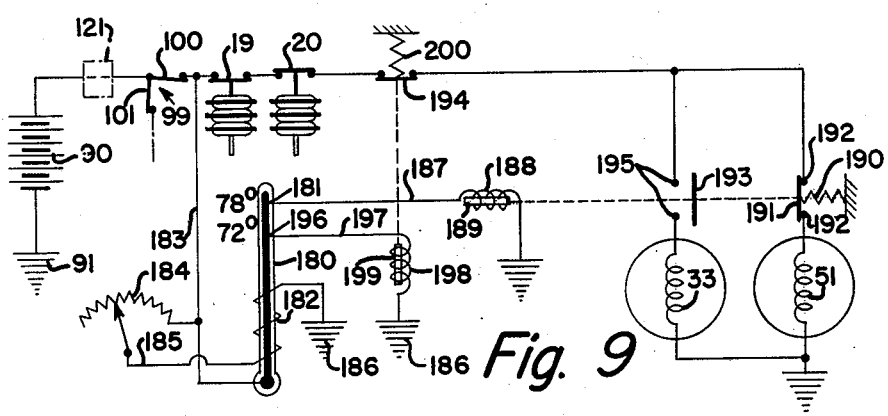
Figure 9 is a wiring diagram showing a different type of thermostatic control for the compressor drive.

Figure 9 shows a mercury type of thermostatic controller in the passenger compartment which may be used in combination with any of the foregoing figures. In this mercury type of control a mercury thermostat 180 is provided to select whether high or low compressor speeds are to be selected when the passenger compartment temperature is above or below some selected maximum temperature such as 78° as indicated at the point 181. The construction is such that if the temperature drops below 78°, then the compressor operates at low speed ratio regardless of the position of the throttle or other controlling agents. When the temperature falls below a selected minimum temperature, such as 72°, then the compressor is not driven.

To this end, the mercury thermostat 180 is heated by a heater 182 which may be calibrated to adjust the temperatures to which the thermostat is responsive. The heater 182 is heated through a line 183, rheostat 184, line 185, heater 183 and ground 186. Adjusting the rheostat 184 determines the heat generated by the heater 182 and thus the mercury thermostat 180 can be calibrated by the rheostat. If the thermostat is adjusted to a maximum temperature of 78° at the point 181, then electrical energy will flow through the line 187 whenever the temperature in the passenger compartment is above 78°, but will not flow through that line when the temperature is below 78°. The connection to the solenoid operated clutches is such that when the current flows through the line 187, the clutches may be either in the high or low speed ratio, if there are other controls. When no current is flowing through the line 187, then only the low speed ratio is possible, so that only a reduced refrigeration output is provided, since the passenger compartment is now below the desired maximum temperature of 78°. Under these conditions, no current can flow through the solenoid 188, and the armature 189 moves leftward by the action of the compression spring 190 to move contact 191 away from contacts 192 and the contact 193 against the contacts 195. Current then flows to the low speed ratio solenoid 33. Should the passenger compartment temperature drop below minimum temperature 72°, corresponding to point 196 on the thermostat, then current is cut off from line 197 and the solenoid 198 is deenergized. Under these conditions, the armature 199 drops downward by the action of spring 200 and opens the switch 194 and thus deenergizes both solenoids of the clutch construction and the compressor is not driven, and further refrigeration is stopped.

Figure 10:
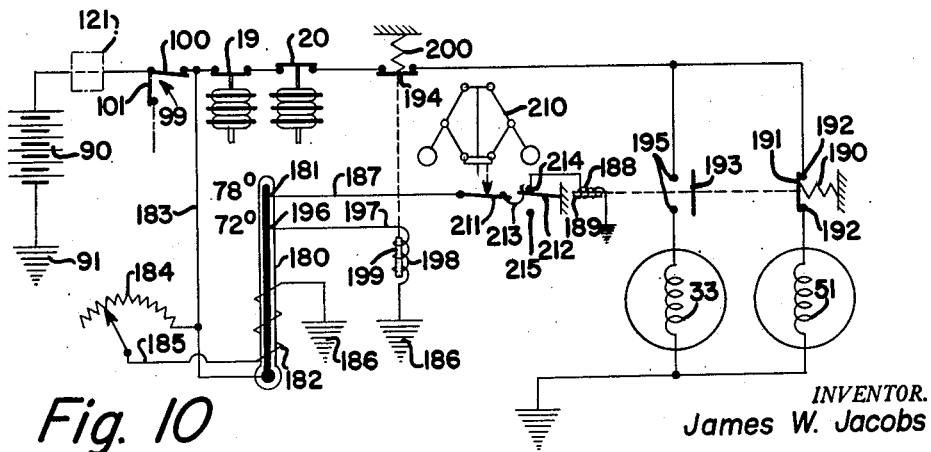
Figure 10 is a wiring diagram similar to Figure 5, but showing a different type of thermostatic control.

Figure 10 shows a combined mercury thermostat control of the type heretofore described for Figure 9 and a centrifugal switch control wherein the centrifugal governor 210 is driven by the engine and determines whether the high or low speed solenoid is to be energized. All of the members in Figure 10 which are numbered 200 or below operate substantially in the same manner as heretofore described with respect to Figure 9. When the centrifugal governor 210 indicates that the engine is running at a relatively low speed, the switch blade 211 is pushed downwardly, causing the C-spring 213 to move the switch blade 212 upwardly against the contact 214, and this energizes the solenoid 188. The solenoid 188 pushes the armature 189 rightward, thus closing the contact 191 on contacts 192 against the action of compression spring 190, and causing the high speed solenoid 51 to be energized. When the engine rises to a high speed, then the centrifugal governor 210 moves blade 211 upwardly and causes C-spring 213 to move blade 212 downwardly against contact 215 which is not connected to any electrical device. Under these conditions, solenoid 188 is deenergized allowing the compression spring 190 to move the contact 193 against stationary contacts 195 and opening 191, thus energizing low speed ratio 33 and deenergizing high speed solenoid 51.

Figure 11:
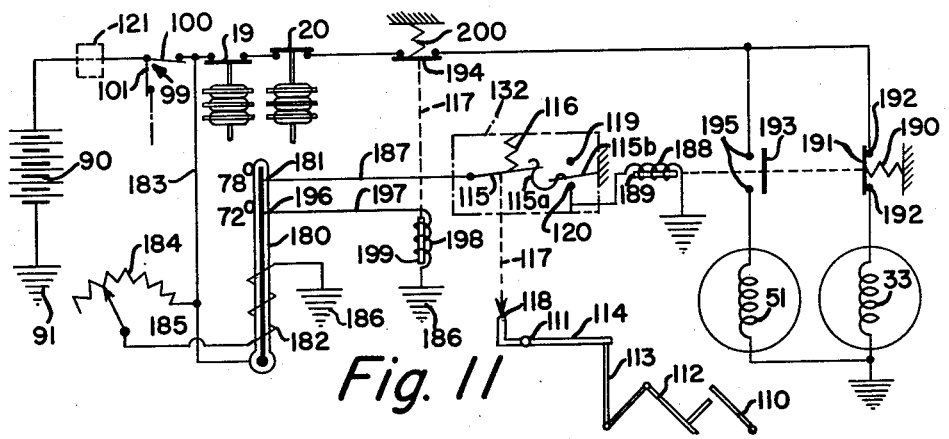
Figure 11 is a view somewhat similar to Figure 7 but showing a different type of thermostatic control.

Figure 11 shows a combined throttle and mercury thermostat control wherein the mercury controls described with respect to Figure 9 have been combined with the throttle controls of Figure 7. Elements peculiar to Figures 7 and 9 have been numbered with reference characters of the respective Figures 7 and 9 and the descriptions heretofore given renders Figure 11 self-explanatory.

Figure 12:
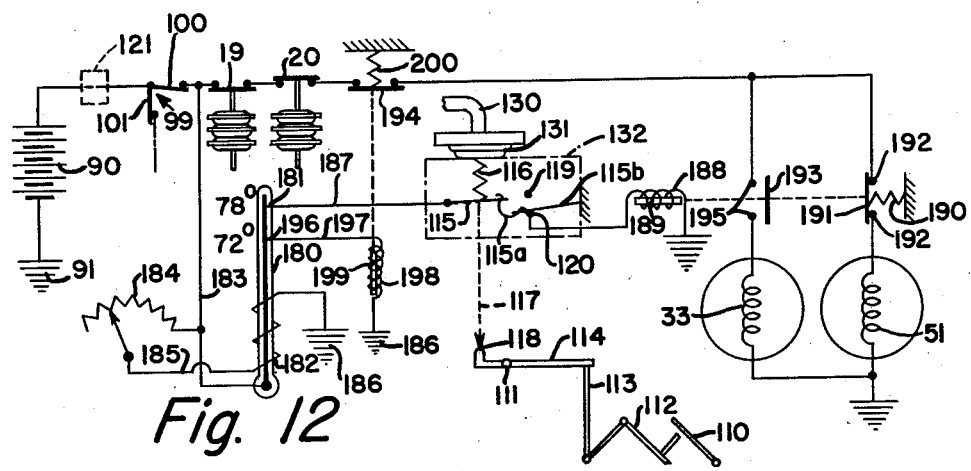
Figure 12 is a view somewhat similar to Figure 8 but showing a different type of thermostatic control.

Figure 12 shows a combined mercury thermostat, pedal and suction manifold control wherein the mercury controls described with respect to Figure 9 have been combined with the throttle-manifold controls of Figures 8 and 14. Elements peculiar to Figures 8, 9 and 14 have been numbered with reference characters of the respective Figures 8, 9 and 14. The descriptions heretofore given render Figure 12 self-explanatory.

Figure 13:
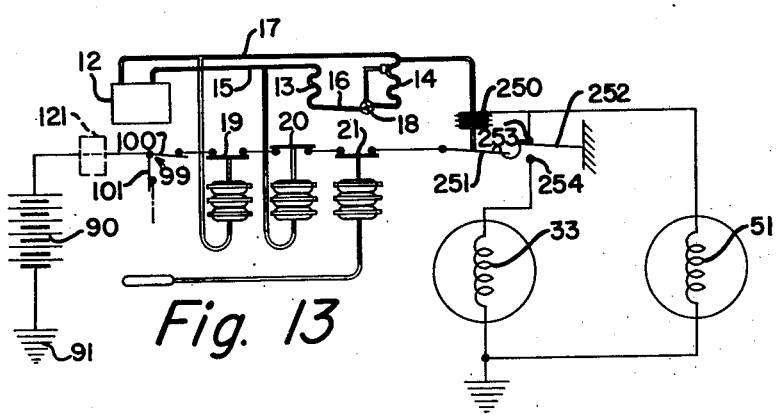
Figure 13 is a view showing the varying speed ratio controlled by a refrigerant condition.

Figure 13 shows a control which is responsive to a refrigerant condition to determine which speed ratio is selected. For example, the bellows 250 is responsive to the "back pressure" side pressure of the refrigerating system. When the back pressure is high, the bellows 250 pushes the blade 251 down, causing blade 252 to engage contact 253, thus energizing the high speed ratio solenoid 51. When the back pressure falls to normal low operating pressures, then bellows 250 causes blade 252 to close on contact 254, thus energizing the low speed ratio solenoid 33 to provide normal output of refrigeration for normal requirements.

Figure 15:
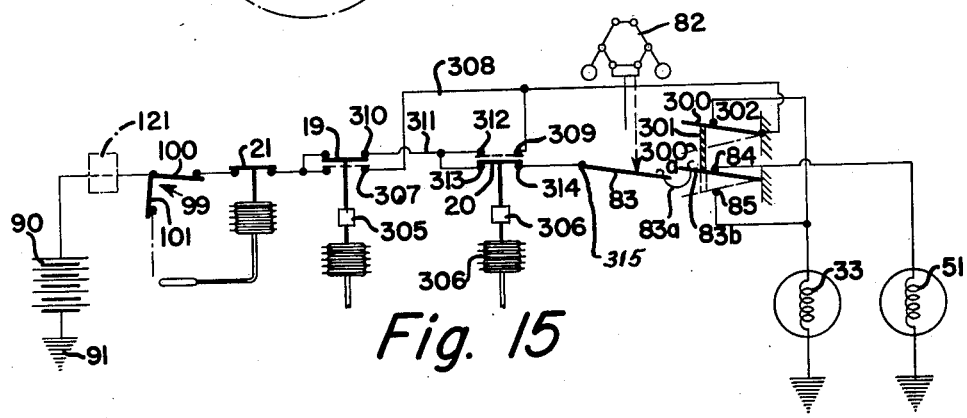
Figure 15 is a view of a wiring diagram showing the combination of a refrigerant condition control cooperating with an engine responsive control to determine the speed ratio.

Figure 15 shows a modification of the system disclosed in Figure 5, in which a condition of the refrigerating system combines with a condition of the engine or car to select whether the high or the low speed ratio is energized.

Figure 15, an engine or car condition such as the speed of the engine, acting through the centrifugal governor 82, normally actuates the blade 83 to energize the high speed solenoid 51 when the engine is at low speed and to energize the low speed solenoid 33 when the engine speed is high as in Figure 5. However, the refrigerant conditions may modify the selections made by the governor 82 to prevent high compressor speed when the refrigerant head pressure is too high and/or when the refrigerant suction pressure is too low.

To accomplish the foregoing modification, the switch blade 83b is connected to an additional blade 300 by means of an insulating actuator 301. A contact 302 is energized by the blade 300 when the blades 83b and 300 are in their upper position. The contact 302 is connected to the low speed ratio solenoid 33. When the blades are in their lower position, then the blade 300 is in an open position as indicated at 300a.

The refrigerant back pressure switch 19 is provided with a snap acting mechanism 305 which snaps the blade 19 from one position to the other.

Likewise, the head pressure switch 20 is provided with a snap acting mechanism 306 which snaps the blade 20 from one position to another. The contact 307 of the switch 19 is connected by the line 308 with blade 300. Likewise, the contact 309 of the switch 20 is connected with blade 300. The contact 310 of the switch 19 is connected by the line 311 with the contacts 312 and 313 of the switch 20. The contact 314 of the switch 20 is connected with the blade 83.

When the refrigerant back pressure and head pressure are normal, as indicated by the full line switch positions in Figure 15, then the electric energy runs through the switch blade 100 to the contacts 310, 313, 314 and 315 to the blade 83 which then energizes the solenoids 33 or 51 in response to engine precisely as previously described with respect to Figure 5. However, if the refrigerant back pressure should become abnormally low, the bellows of switch 19 would contract and would snap the blade 19 to the lower dotted line position by the action of snap acting mechanism 305. Electrical energy would go through contact 307, line 308, blade 300, contact 302 to the low speed solenoid 33, provided that the engine speed was low and the centrifugal governor 82 causes blades 83b and 300 to be in the full line, upper position. However, if the engine were operating at a high speed, so that the blades 83b, 300 were in their lower position, then the excessively low refrigerant back pressure would deenergize the solenoid 33, because the blade 300 would be in the open position 300a, and the line to the blade 83 would be opened at 310. Solenoid 51 also would be deenergized under the latter conditions.

If the refrigerant head pressure should become abnormally high, then the snap acting mechanism 306 would snap the blade 20 to the upper position. At this time, if the back pressure is normal, then the electric power would go through contacts 310, 312, 309 to the blade 300. If the engine speed is low, with blades 83b and 300 in the upper position, then contact 302 would be energized and solenoid 33 would be energized instead of solenoid 51. If the engine speed were high, placing blades 83b and 300 in the lower position, which normally would energize solenoid 33, then the abnormally high refrigerant head pressure would deenergize all of the solenoids, since blade 300 would be in the open position 300a, and the power to blade 83 would be broken at the open contacts 313 and 314.

Should the refrigerant back pressure be abnormally low simultaneously with an abnormally high head pressure, then the solenoid operation would be the same as if only one abnormal refrigerant condition were present.

While the centrifugal governor 82 has been shown as the actuator for blade 83, in response to engine speed, it is to be understood that any other actuator for blade 83 may be used which may be responsive to any of the other engine and/or car conditions previously described.

The remainder of the electric system, indicated by the dotted square 121 in Figure 15 may be the same as in the other electrical systems disclosed in previous figures.

This application is a continuation-in-part of my copending application S. N. 350,185 filed April 21, 1953, which issued on February 19, 1957, as Patent 2,781,642.

While the form of embodiment of the invention as herein disclosed constitutes a preferred form, it is to be understood that other forms might be adopted as may come within the scope of the claims which follow.

What is claimed is as follows:

1. In combination: a vehicle; an engine driving said vehicle and having an engine shaft; a vehicle space to be cooled; a refrigerating system on said vehicle and including a compressor, condenser and evaporator in refrigerant flow relationship with said evaporator cooling said vehicle space; a rotatable compressor shaft operating said compressor; a compressor first speed ratio pulley freely rotatable on said compressor shaft; a compressor first speed magnetic clutch for clutching said last pulley to said compressor shaft; belting from said engine shaft to said last pulley; a driven compressor second speed ratio pulley fixed on said compressor shaft; a separate driven element shaft on said vehicle driven by said engine; a driving compressor second speed ratio pulley freely rotatable on said last shaft; a compressor second speed magnetic clutch for clutching said last pulley to said last shaft; belting between said compressor second speed ratio pulleys; and means selectively energizing said magnetic clutches.

2. In combination: a vehicle; an engine driving said vehicle and having an engine shaft; a vehicle space to be cooled; a refrigerating system on said vehicle and including a compressor, condenser and evaporator in refrigerant flow relationship with said evaporator cooling said vehicle space; a rotatable compressor shaft operating said compressor; a compressor first speed ratio pulley freely rotatable on said compressor shaft; a compressor first speed magnetic clutch for clutching said last pulley to said compressor shaft; belting from said engine shaft to said last pulley; a driven compressor second speed ratio pulley fixed on said compressor shaft; a separate driven element shaft on said vehicle driven by said engine; a driving compressor second speed ratio pulley freely rotatable on said last shaft; a compressor second speed magnetic clutch for clutching said last pulley to said last shaft; belting between said compressor second speed ratio pulleys; and means responsive to engine speed selectively energizing said clutches.

3. In combination: a vehicle; an engine driving said vehicle; a vehicle space to be cooled; a refrigerating system on said vehicle and including a compressor, condenser and evaporator in refrigerant flow relationship with said evaporator cooling said vehicle space; a rotatable compressor shaft operating said compressor; a compressor first speed ratio member freely rotatable on said compressor shaft; a compressor first speed clutch for clutching said first speed ratio member to said compressor shaft; driving means between said engine and said first speed ratio member; a driven compressor second speed ratio member fixed on said compressor shaft; a separate driven element shaft on said vehicle driven by said engine; a driving compressor second speed ratio member freely rotatable on said last shaft; a compressor second speed clutch for clutching said last member to said last shaft; driving means between said compressor second speed ratio members; and means selectively energizing said clutches.

4. In combination, a vehicle, an engine driving said vehicle and having an engine shaft, a vehicle space to be cooled, a refrigerating system on said vehicle and including a compressor, condenser and evaporator in refrigerant flow relationship with said evaporator cooling said vehicle space, a rotatable compressor shaft operating said compressor, said engine having a drive shaft with two pulleys and a water pump shaft with three pulleys, a generator provided with a shaft and pulley, an accessory provided with a shaft and a fixed pulley and a clutch pulley, said compressor shaft being provided with a fixed pulley and a clutch pulley, a first belt connecting a drive shaft pulley with a water pump pulley and said generator pulley, a second belt connecting a drive shaft pulley with a water pump pulley and said fixed accessory pulley, a third belt connecting a water pump pulley and said compressor shaft clutch pulley, and a fourth belt connecting said accessory clutch pulley and said fixed compressor shaft pulley.

5. In combination, a vehicle, an engine driving said vehicle and having an engine shaft, a vehicle space to be cooled, a refrigerating system on said vehicle and including a compressor, condenser and evaporator in refrigerant flow relationship with said evaporator cooling said vehicle space, a rotatable compressor shaft operating said compressor, said engine having a drive shaft with two pulleys and a water pump shaft with three pulleys, a generator provided with a shaft and pulley, an accessory provided with a shaft and a fixed pulley and a clutch pulley, said compressor shaft being provided with a fixed pulley and a clutch pulley, a first belt connecting a drive shaft pulley with a water pump pulley and said generator pulley, a second belt connecting a drive shaft pulley with a water pump pulley and said fixed accessory pulley, a third belt connecting a water pump pulley and said compressor shaft clutch pulley, and a fourth belt connecting said accessory clutch pulley and said fixed compressor shaft pulley, said accessory and compressor clutch pulleys being of substantially identical construction.

6. In combination, a vehicle, an engine driving said vehicle and having an engine shaft, a vehicle space to be cooled, a refrigerating system on said vehicle and including a compressor, condenser and evaporator in refrigerant flow relationship with said evaporator cooling said vehicle space, a rotatable compressor shaft operating said compressor, said engine having a drive shaft with two pulleys and a water pump shaft with three pulleys, a generator provided with a shaft and pulley, an accessory provided with a shaft and a fixed pulley and a clutch pulley, said compressor shaft being provided with a fixed pulley and a clutch pulley, a first belt connecting a drive shaft pulley with a water pump pulley and said generator pulley, a second belt connecting a drive shaft pulley with a water pump pulley and said fixed accessory pulley, a third belt connecting a water pump pulley and said compressor shaft clutch pulley, a fourth belt connecting said accessory clutch pulley and said fixed compressor shaft pulley, said engine being provided with a fuel supply including an intake manifold provided with a throttle, and means responsive to low manifold pressure and a partly closed throttle for operatively connecting said compressor clutch pulley and said compressor shaft and disconnecting said accessory clutch pulley from the accessory shaft and responsive to higher manifold pressure and a wider opened throttle for disconnecting said compressor clutch pulley from said compressor shaft and connecting said accessory clutch pulley to said accessory shaft.

7. In combination, a vehicle, an engine driving said vehicle and having an engine shaft, a vehicle space to be cooled, a refrigerating system on said vehicle and including a compressor, condenser and evaporator in refrigerant flow relationship with said evaporator cooling said vehicle space, a rotatable compressor shaft operating said compressor, said engine having a drive shaft with two pulleys and a water pump shaft with three pulleys, a generator provided with a shaft and pulley, an accessory provided with a shaft and a fixed pulley and a clutch pulley, said compressor shaft being provided with a fixed pulley and a clutch pulley, a first belt connecting a drive shaft pulley with a water pump pulley and said generator pulley, a second belt connecting a drive shaft pulley with a water pump pulley and said fixed accessory pulley, a third belt connecting a water pump pulley and said compressor shaft clutch pulley, a fourth belt connecting said accessory clutch pulley and said fixed compressor shaft pulley, and means responsive to low engine speed for operatively connecting said compressor clutch pulley and said compressor shaft and responsive to higher engine speed for operatively connecting said accessory clutch pulley and said accessory shaft.

References Cited in the file of this patent

UNITED STATES PATENTS

| | | |
|---|---|---|
| Re. 19,858 | Fehr | Feb. 18, 1936 |
| 1,983,827 | Winther et al. | Dec. 11, 1934 |
| 2,094,449 | Forichon | Sept. 28, 1937 |
| 2,130,995 | Henny | Sept. 20, 1938 |
| 2,264,821 | Zukoski | Dec. 2, 1941 |
| 2,416,154 | Chilton | Feb. 18, 1947 |
| 2,460,135 | Lehane et al. | Jan. 25, 1949 |
| 2,649,941 | Doebeli | Aug. 25, 1953 |
| 2,720,087 | Groene | Oct. 11, 1955 |